Jan. 11, 1938.　　　A. H. KELLING　　　2,105,217
MANUFACTURE OF STARCH
Original Filed June 12, 1933　　2 Sheets-Sheet 1
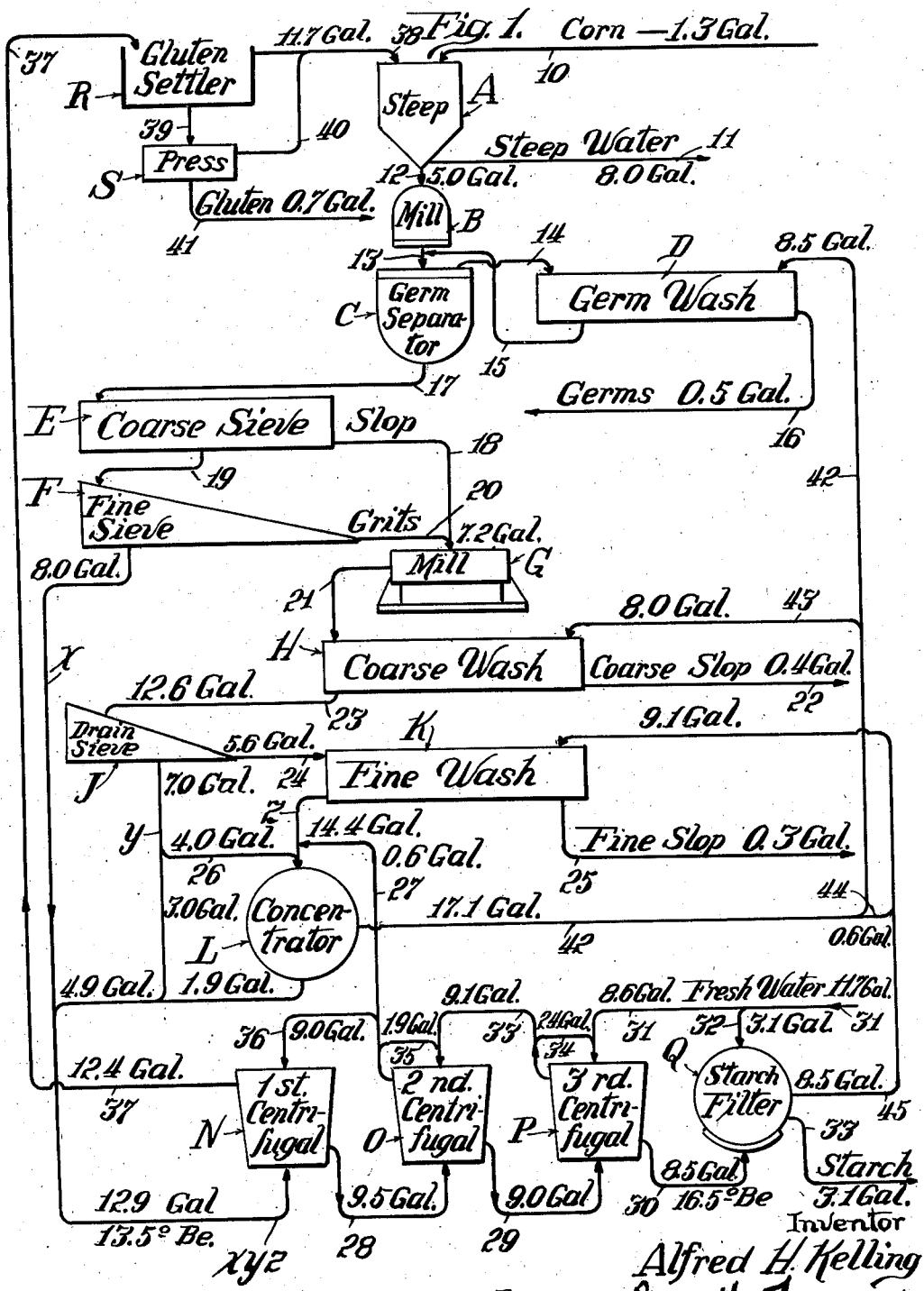
Inventor
Alfred H. Kelling
By Barnett & Truman
Attorneys

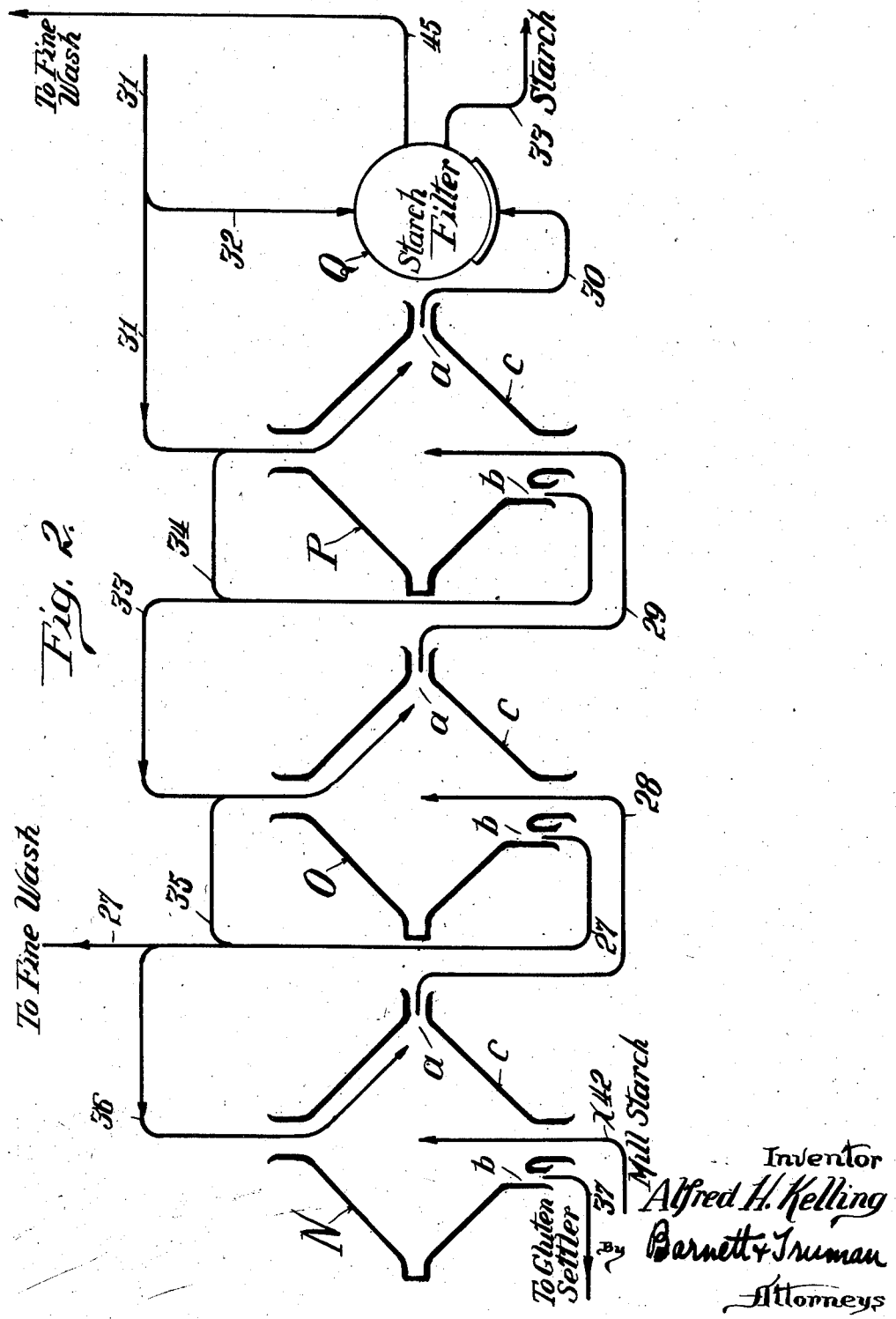

Patented Jan. 11, 1938

2,105,217

UNITED STATES PATENT OFFICE 2,105,217

MANUFACTURE OF STARCH

Alfred H. Kelling, Oak Park, Ill., assignor to International Patents Development Company, Wilmington, Del., a corporation of Delaware Original application June 12, 1933, Serial No. 675,412. Divided and this application June 4, 1936, Serial No. 83,536

15 Claims. (Cl. 127—68)

This invention relates to the manufacture of starch from corn by the wet method; and particularly to a process in which all, or substantially all, of the process waters (except the steep water and the water absorbed in the discharged solids) are returned to the process for re-use, for the purpose of saving the solids, soluble and insoluble, therein, and preventing the pollution of streams which results from discharging process waters from the factory.

In the manufacture of starch from corn it has been customary to steep the corn and withdraw the steep water to evaporators for recovery of the corn solubles contained therein. The steeped corn is then comminuted and subjected to separating operations in water for removal of the germs, hulls and fiber. The usual method has been to break up the corn coarsely, separate the germs by flotation and wash the germs to remove starch and gluten; then grind the residue of the corn material as finely as possible, and subject the ground material to what is known as a coarse slop separating or washing operation in which starch and gluten are washed from the slop (hulls and fibrous part of the corn kernels) by passing the material through copper reels or over copper covered shakers; after which the mixture of starch, gluten and water from the last-mentioned operation is passed through fine silk covered sieves to remove residual slop particles therein, which latter are then subjected to a washing operation in a series of silk covered reels or on silk covered shakers, for the purpose of washing out of the fine slop the starch and gluten which it contains. The mill starch streams (starch, gluten and water) from the germ, coarse slop and fine slop separating or washing operations are then run together and tabled, according to customary practice, for the purpose of separating the gluten from the starch. The starch removed from the tables, usually by flushing, is dewatered and washed with fresh water in filters of the displacement type operated by pressure or vacuum. The gluten is allowed to settle in the gluten settlers. The starch filtrate and wash water, and the gluten settler water are returned to the process for re-use.

This application is a division of copending application Serial No. 675,412 filed June 12, 1933, in which are disclosed several alternative methods whereby the operation of separating the gluten from the starch is accomplished in a particularly advantageous manner by means of centrifugal machines instead of by a tabling operation, as has been customary for many years.

Starch tables require a great deal of floor space and are expensive to maintain in repair, besides requiring constant attention in respect particularly to the maintenance of proper flow of the mill starch over the tables, upon which the adequacy of the separation depends. Of late years it has been customary to return to the process for re-use all process waters, or at least a very large proportion of the process waters, for the purpose of saving soluble substances contained therein and preventing stream pollution. Application Serial No. 675,412, discloses several methods according to which centrifugal machines are substituted for starch tables with such arrangements of the instrumentalities for carrying out the process that, in the first place, all process waters may be re-absorbed in the system; that in the second place, the process water which by the nature of the process contains the largest quantity of soluble substances and the water which has necessarily been longest in the process, and for these reasons will be the most highly infected with micro-organisms, to-wit, the water from the gluten settlers, may be returned to the process at the steeps, while the other process waters, containing much smaller quantities of soluble substances and which have been in the process a shorter time, are utilized as wash waters in the wet starch system, that is, in the germ, coarse slop and fine slop separating operations; and that in the third place, the soluble substances, yellow colored substances and other impurities, are to a considerable extent kept out of the process waters intended to be reused in the wet starch system and are concentrated in the process water intended for reuse in the steeps. The relatively highly infected gluten settler water with its larger content of impurities and yellow colored substances may be used for steeping without bringing about any infection or contamination of the material treated, because of the high temperatures and sulphur dioxide concentrations used in steeping and because the material treated in the steeps is in the form of unbroken grain. In the germ, coarse slop and fine slop separating operations the temperatures and sulphur dioxide concentrations are lower than in the steeps and the material treated is in a finely divided state so that it is particularly susceptible to the action of micro-organisms and to the contaminating effect of solubles, yellow colored substances and other impurities. By using for the germ, coarse slop and fine slop separating operations a water less infected and containing a smaller quantity of soluble and colored substances than the gluten settler water, using such water to the exclusion of gluten settler water, not only is the washing of the starch on the starch filters facilitated, but a purer starch is obtained since, because of the colloidal character of the impurities resulting from the use of the gluten settler water in the germ, coarse slop and fine slop separations, it is impossible to remove such impurities from the starch even by repeated washing.

The process also gives a whiter starch. The solubles and other impurities include substances which tend to give starch a yellowish color, particularly starch made from certain grades of corn. By concentrating these substances in the process water returned exclusively to the steeps and keeping them, so far as possible, out of the process waters used in the wet starch system a whiter as well as a purer starch is obtained.

The present invention relates to one of the specific processes disclosed in application Serial No. 675,412, wherein the arrangement of the instrumentalities for carrying out the process is such as to insure a particularly close separation as between starch and gluten for a given amount of water used.

The invention is illustrated in a preferred form in the accompanying drawings, in which Fig. 1 is a flow sheet diagram of the whole process; and Fig. 2 is a more detailed diagram illustrating the course of the liquids through the centrifugal system.

It will be understood that Fig. 1 of the drawings, for the purpose of simplification, shows single units where in practice there will be batteries, for example of steep tanks, sieves, etc. The showing of machinery is purely diagrammatic. Any suitable apparatus may be used for carrying out the process steps illustrated.

The numerals on the drawings followed by the abbreviation "Gal." indicate quantities of water present measured in gallons per bushel of corn ground. These figures are to be taken as illustrating a practical water balance. They may vary considerably for different installations. The aim is to re-use in the system all process waters except the steep water, evaporated for the purpose of saving solubles, and the relatively small quantities of water that go out of the system absorbed in the discharged solids. However, it would be possible, obviously, to obtain some of the advantages of the invention by arrangements that might involve discharge of small quantities of the process water to the sewer; although such practice would have the disadvantages of loss of some solubles and the possibility of stream pollution. Similarly it would be possible, but certainly not desirable, to return small quantities of gluten settler water to the wet starch system, that is the germ, coarse slop, and fine slop separations; and this might be desirable in some cases in order to bring about a proper water balance. However, the re-use of small amounts of gluten settler water, or other highly infected water, in the wet starch system is not recommended, nor is it necessary.

Referring first to Fig. 1: A designates the steeping system; B the mill for cracking the corn to release the germs; C the germ separator in which the germs are floated off and separated from the rest of the corn; D the apparatus for washing the germs; E a coarse sieve which receives the degerminated corn from the separator C; F a fine sieve for separating a starch, gluten and water mixture (mill starch) from the degerminated corn; G the mill for grinding the slop and grits from the coarse and fine sieves E and F; H the coarse slop washing apparatus for washing the ground material from the mill G; J a draining sieve through which the liquid from the coarse slop wash is passed; K the fine slop washing apparatus for removing starch and gluten from the tailings from the drain sieve J; L a concentrator for extracting water from the mill starch, from the coarse wash H and fine wash K; N, O and P, three centrifugals arranged on a modified countercurrent principle through which the combined mill starch streams from the germ system, through fine sieve F, from the coarse wash H, through sieve J, and from fine wash K after concentration are passed for the primary purpose of separating the gluten from the starch and also for the purpose of concentrating solubles in the gluten overflow. A larger or smaller number of centrifugals might be employed. Q is a dewatering and washing filter which receives the starch from the last centrifugal P of the series. The starch is washed in filter Q with fresh water by which is intended either tap water or other water containing a small quantity of solubles or other impurities. R is a settler or other dewatering means, for removing water from the gluten in the overflow from the centrifugal system; and S is a press for pressing the gluten from the settler R to extract more water therefrom.

The conduits between the above enumerated instrumentalities (which conduits will be referred to as pipes, although they may in some cases be troughs, conveyors or other conducting means) will be referred to in connection with the description of the operation of the system which is as follows:

*Operation of process.*—The corn containing 1.3 gallons of water enters the steeping system A at 10. From the steeping system 8.0 gallons of steep water are withdrawn through pipe 11 to the evaporator (not shown), where this water is evaporated to a sufficient extent, for example, to mix with the slops and gluten for the manufacture of cattle feed. In this or other suitable ways the corn solubles leeched out of the corn in the steeping operation, are saved, together with those contained in the process water used for steeping the corn.

The steeped corn with 5.0 gallons of water passes through pipe 12 to the mill B where it is coarsely ground. The ground material passes through pipe 13 to the germ separator C from which the germs are floated off, passing through pipe 14 to the germ washing system D. Starch milk passes from the germ wash D through pipe 15 back to the separator C for supplying liquid of the necessary gravity for effecting the separation as between the germs and the rest of the corn. The washed germs are discharged from the germ-washing system at 16 with 0.5 gallon of water. The degerminated corn is discharged from the separator C through pipe 17 to coarse sieve E. The tailings or slop from the coarse sieve E pass through pipe 18 to mill G. The starch milk from sieve E passes through pipe 19 to the fine sieve F, the tailings or slop from which pass through pipe 20 to the mill G the material entering the mill containing 7.2 gallons of water. The mill starch passing through the fine sieve F goes into a pipe *x* leading to the centrifugal machines. This stream contains 8.0 gallons of water, together with starch, gluten, solubles and suspension colloid substances and is practically free of all bran and fiber.

The grits and slop entering mill G are there ground as finely as possible, and the ground material passes through pipe 21 to the coarse slop wash H consisting of a series of copper reels or shakers, ordinarily, through which the material is passed successively. The coarse slop, containing 0.4 gallon of water, passes out of the system at 22. The bulk of the water, (12.6 gallons) containing starch and gluten, and some fine bran particles, passes from the coarse slop wash H through pipe 23 to the drain sieve J and thence into mill starch pipe $y$. The tailings from the sieve J, containing 5.6 gallons of water pass through pipe 24 to the fine slop wash K which consists, ordinarily, of reels or shakers covered with bolting cloth. The fine slop containing 0.3 gallon of water is discharged from the system at 25. The mill starch from the fine slop passes into pipe $z$.

L is a concentrator, which may be a settling tank but is preferably a vacuum filter, which receives 14.4 gallons of mill starch from the fine wash K through pipe $z$, 4.0 gallons of mill starch from the coarse wash H through the drain reel J and branch 26 of pipe $y$, and 0.6 gallon of the overflow from the second centrifugal machine O through pipe 27, the latter as a water balancing expedient. These liquids are concentrated in the concentrator L, by extraction of water, so that the solids from the concentrator discharged through the other branch of pipe $z$ have a water content of 1.9 gallons. This material is mixed with 3.0 gallons of mill starch from the coarse slop wash through pipe $y$ and 8.0 gallons from the germ system through pipe $x$ making 12.9 gallons going to the centrifugal N through the line marked $xyz$, the density of which is approximately 13.5° Baumé. The underflow from the first centrifugal N, 9.5 gallons, and consisting largely of starch, passes through pipe 28 to the second centrifugal O. The underflow from centrifugal O, 9.0 gallons, passes through pipe 29 to centrifugal P. The underflow from centrifugal P, 8.5 gallons, passes through pipe 30 to the washing filter Q. It will have a density of about 16.5° Baumé; the flow of liquids through the centrifugal system being controlled so as to increase the density of the discharged starch liquor to a density proper for filtering. The starch from centrifugal P is first dewatered in the filter Q and is then washed with fresh water, 3.1 gallons, introduced through pipes 31, 32. The purified starch containing 3.1 gallons of water is discharged from the system at 33. The total fresh water introduced into the system is 11.7 gallons. 8.6 gallons of this pass through pipe 31 to the third centrifugal P. 9.1 gallons of the overflow from the third centrifugal P pass through pipe 33 to the second centrifugal O, 2.4 gallons, however, passing back through pipe 34 to the third centrifugal P. Of the overflow from the second centrifugal O, 0.6 gallon, as stated above, pass through pipe 27 to the concentrator L, while 1.9 gallons pass through branch pipe 35 back to the second centrifugal O and 9.0 gallons go forward to the first centrifugal N through pipe 36. The overflow from centrifugal N (12.4 gallons) passes into pipe 37.

By diverting a part of the overflow from each centrifugal (except the first) and sending such part back to the centrifugal from which it came the dilution of the material undergoing separation is increased with, consequently, a repeated separation of starch from gluten.

As described in application Serial No. 675,412, the centrifuging operation involves introducing the fresh water, or, as the case may be the overflow from one centrifugal to the next, into the underflow zone of the centrifugal to which the liquid passes in each case, with the result that the solubles and other impurities are concentrated in the overflow from the first centrifugal. Inasmuch as the overflow from the first centrifugal is sent back to the steeps, after the gluten has been removed therefrom, the advantage in concentrating the solubles and other impurities in this water will be obvious. This concentration is due in part to dilution but also, apparently, to displacement since there has been found to be a greater concentration of solubles in the overflow than can be accounted for, mathematically, on the basis of dilution alone. That is the starch milk before it reaches the underflow zone has split off from it water with a high solubles content which is replaced by the wash water having a relatively lower solubles content.

This method of centrifuging is illustrated in the detailed diagram of the centrifugal system shown in Fig. 2 of the drawings. In this diagram $a$ indicates the starch underflow zone of the centrifugal machine, in each case, and $b$ the outlet for gluten which leads from the overflow zone of the machine; $c$ designating the rotating shell of the machine, which may be of any preferred construction. The fresh water pipe 31 and the overflow pipes 33 and 36 deliver their liquids to the starch zone $a$ of the centrifugal machine so as to bring about the displacement effect above described and ultimately the concentration of the major portion of the solubles of the mill starch in the streams of gluten and water discharged from the centrifugal system.

The process waters are returned to the process as follows: The overflow from the first centrifugal, 12.4 gallons, passes through pipe 37 to the settler R. The water from the settler passes through pipe 38 to the steeps A. The gluten from the settler passes through pipe 39 to the press S, the water from the press going to pipe 38 and the steeps through pipe 40. 11.7 gallons of water enter the steeps giving a draw-off at 11 of 8.0 gallons. This rather large draw-off is due to the comparatively large quantity of fresh water used in filter and centrifugals. The gluten is discharged from press S at 41 with 0.7 gallon of water.

The water from the concentrator L passes through pipe 42, 8.5 gallons going to the germ wash D and 8.0 gallons, through branch pipe 43, to the coarse wash H and 0.6 gallon, through pipe 44 to pipe 45 which conducts the starch wash water from filter Q, 8.5 gallons, to the fine wash K.

The water from the concentrator L contains a relatively small amount of soluble substances because of the low solubles content of the mill starch from the coarse and fine washes in comparison with the mill starch from the germ system. It is for this reason that in concentrating the mill starch before centrifuging it, it is preferable to so treat all of the fine wash mill starch and as much of the coarse wash mill starch as necessary in order to obtain the required high density in the liquid treated in the centrifugal machine.

By the above arrangements the greater the solubles content of a process water the closer the water will be returned to the point of ultimate discharge from the system, the steeping process, thus keeping the later stages of the process as free from solubles as possible. Since the quantities of liquid which pass through pipes 27 and 44 are small, it may be said that substantially all of the gluten overflow from the centrifugal system goes to the gluten settler and thence to the steeping system; substantially all of the water obtained by dewatering the starch from the centrifugal system, centrifugal machine P, goes to the fine wash; and substantially all of the water derived from the concentrator L is distributed as between the germ wash and coarse slop wash.

The concentration of the mill starch at L, which raises the density of the combined mill starch streams entering the centrifugal system, is an important feature of the process. Centrifugal machinery is relatively expensive and costly to operate and the concentration of the mill starch results in a proportionate decrease in required centrifugal equipment. What is perhaps more important, it is more feasible to centrifuge a liquor of relatively high density than a liquor of the density of the mill starch as it comes from the separating operation. The denser liquor can be held in the centrifugal machine in order to allow time for separation without making the starch discharge orifices so small that they are likely to be clogged.

No claim is made to any invention common to this application and the other forms disclosed in the parent case Serial No. 675,412 of which the present case is a division, the generic claims being included in the parent case and certain other forms being claimed specifically in other divisional applications of said parent case. It is the intention, however, to cover herein all applications of the described process to other industries than starch making together with all modifications of the particular form of the invention disclosed herein within the scope of the appended claims.

I claim:

1. The process of manufacturing starch from corn comprising: comminuting the corn; subjecting it to separating operations in water; subjecting the mill starch to a series of centrifuging operations through which the underflow moves in one direction and the overflow in the other; and in the case of some of said operations returning a part of the overflow back to the operation from which it came.

2. The process of manufacturing starch from corn in which substantially all process waters, except the steep water and water absorbed in the discharged solids, are re-used in the process comprising: steeping and comminuting the corn; subjecting the comminuted corn to separating operations in water; concentrating the mill starch by extracting water therefrom and returning said water to the separating operations; subjecting the concentrated mill starch to a series of centrifuging operations, against a wash liquid introduced into the last centrifugal, in which a part of the overflow from each centrifugal, except the first, goes to the next centrifugal in advance and the rest of the overflow is returned to the centrifugal from which it came; and reusing the water of the overflow from the first centrifuging operation for steeping corn.

3. The process of manufacturing starch from corn in which substantially all process waters, except the steep water and water absorbed in the discharged solids, are re-used in the process comprising: steeping and comminuting the corn; subjecting the comminuted corn to separating operations in water; subjecting the mill starch to a series of centrifuging operations against a wash liquid introduced into the underflow zone of the last centrifugal in which a part of the overflow from each centrifugal, except the first, is introduced into the next centrifugal in advance, in the underflow zone thereof, and the rest returned to the centrifugal from which it came; and re-using the overflow from the first centrifugal for steeping corn.

4. Method of separating materials which consists in causing a water suspension of the materials to be passed through a series of centrifugals against a wash liquid introduced into the last centrifugal; and causing a portion of the overflow from one centrifugal to be introduced into a centrifugal in advance in the series and the rest of the overflow to be returned to the centrifugal from which it came.

5. Method of separating materials which consists in causing a water suspension of the materials to be passed through a series of centrifugals against a wash water introduced into the underflow zone of the last centrifugal; and causing a portion of the overflow from one centrifugal to be introduced into the underflow zone of a centrifugal in advance in the series, and the rest of the overflow to be returned to the underflow zone of the centrifugal from which it came.

6. Method of separating materials which consists in causing a water suspension of the materials to be passed through a series of centrifugals against a wash liquid introduced into the last centrifugals; and in the case of some of said operations causing a portion of the overflow from the centrifugal to be introduced in the next centrifugal in advance and the rest of the overflow to be returned to the centrifugal from which it came.

7. Method of separating materials which consists in causing a water suspension of the materials to be passed through a series of centrifugals against a wash water introduced into the underflow zones of said centrifugals consisting of fresh water in the case of the last centrifugal and, in the case of the others, overflow from a later centrifugal of the series; and, in the case of some of said operations, causing a portion of the overflow from the centrifugal to be returned to the centrifugal from which it came.

8. Process of manufacturing starch from corn which comprises: subjecting the mill starch to a series of centrifuging operations through which the underflow moves in one direction and the overflow in the other, introducing the overflow into the underflow zone of the centrifugal operation which said overflow enters; and, in the case of some of said operations, diverting a part of the overflow back to the centrifugal operation from which it came.

9. Process of manufacturing starch from corn which comprises: steeping and comminuting the corn; subjecting the comminuted corn in water to separating operations which yield mill starch streams of higher and lower soluble contents; concentrating mill starch of lower solubles content; mixing the concentrating mill starch with the rest of the mill starch and subjecting the mixture to a series of centrifuging operations in which the underflow moves in one direction and the overflow in the other; diverting, in the case of some of said centrifuging operations a part of the overflow back to the centrifugal operation from which it came; removing the gluten from the overflow from the centrifuging operation by settling and re-using the water in the steeping operations; dewatering the underflow from the centrifuging operation; and using the waters derived from said concentrating and starch de-watering operation in the steps of the process subsequent to steeping.

10. Process of manufacturing starch from corn which comprises: steeping and comminuting the corn; subjecting the comminuted corn in water to separating operations which yield mill starch streams of higher and lower solubles contents; concentrating mill starch of lower solubles content; mixing the concentrated mill starch with the rest of the mill starch and subjecting the mixture to a series of centrifuging operations in which the underflow moves in one direction and the overflow in the other; diverting, in the case of some of said centrifugal operations, a part of the overflow back to the centrifugal operation from which it came; removing the gluten from the overflow from the centrifugal operation by settling and re-using the water in the steeping operation; dewatering the underflow from the centrifuging operation; and using the waters derived from said concentrating and starch dewatering operation in the steps of the process subsequent to steeping at points nearer the steeping end of the system in proportion to the solubles contents of said waters respectively.

11. Process of manufacturing starch from corn which comprises: steeping the corn; subjecting the steeped corn, in a comminuted state, to germ, coarse slop and fine slop separations; extracting water from the mill starch from the fine slop separation and returning substantially all of this water to the germ and coarse slop separation; subjecting the concentrated mill starch from the fine slop separation with the mill starch from the germ and coarse slop separations to a series of centrifuging operations in some of which operations a portion of the overflow is returned to the centrifugal from which it came; returning substantially all of the overflow from the first centrifuging operation, after removal of gluten from said overflow to the steeping operation; dewatering the starch from said centrifugal operations; and re-using substantially all of the water from the de-watering operation in the fine slop separation.

12. Method of separating starch from gluten which comprises subjecting a water mixture of the starch and gluten to a series of centrifuging operations in which the underflow, carrying the starch, moves successively from operation to operation, and a portion of the overflow, carrying the gluten, moves, in the opposite direction, from operation to operation, while a portion of the overflow from each operation is returned to the operation from which it came.

13. Method of effecting separation by centrifugal force which consists in causing the liquid mixture of the materials to be passed successively through a plurality of centrifugals and causing a wash liquor to pass through said centrifugals in the opposite direction; the wash liquid and the overflow from one centrifugal to the next entering the underflow zone of the centrifugal, a portion of the overflow in each case being returned to the centrifugal from which it came.

14. Centrifugal apparatus comprising a plurality of centrifugals; means for introducing the underflow from each centrifuge (except the last) into the next machine; means for introducing a wash water into the first centrifuge; means for introducing a wash water into the last centrifuge; means for discharging the overflows from the first and second centrifuges; means for introducing overflow from the last centrifuge into the next machine in advance, and means for diverting some of the overflow from each centrifuge, except the first, back into the machine from which it came.

15. Centrifugal system comprising a series of centrifugal machines; means for introducing a liquid containing the substances to be separated into the first centrifugal; means for introducing the underflow from each centrifugal into the next centrifugal of the series; means for introducing a wash water into the last centrifugal of the series; means for discharging out of the system the overflow from the first centrifugal; means for discharging out of the system part of the overflow of the second centrifugal; and means for diverting part of the overflow from each centrifugal, except the first, back to the centrifugal from which it came.

ALFRED H. KELLING.